No. 790,623. PATENTED MAY 23, 1905.
J. M. ETIMAN.
CULTIVATOR ATTACHMENT.
APPLICATION FILED MAY 28, 1904.
2 SHEETS—SHEET 1.
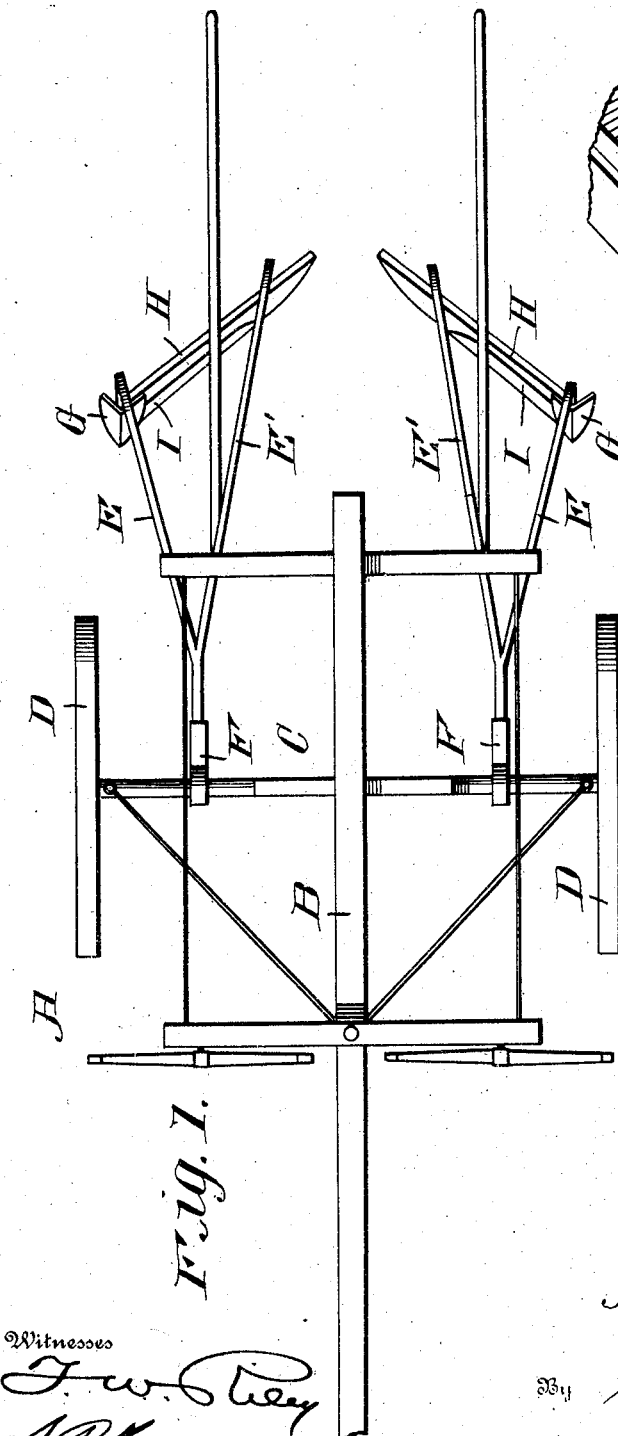
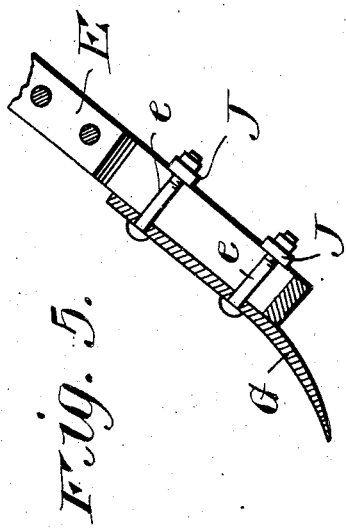
Inventor
John M. Etiman.
Witnesses
By Victor J. Evans
Attorney No. 790,623. PATENTED MAY 23, 1905.
J. M. ETIMAN.
CULTIVATOR ATTACHMENT.
APPLICATION FILED MAY 28, 1904.
2 SHEETS—SHEET 2.
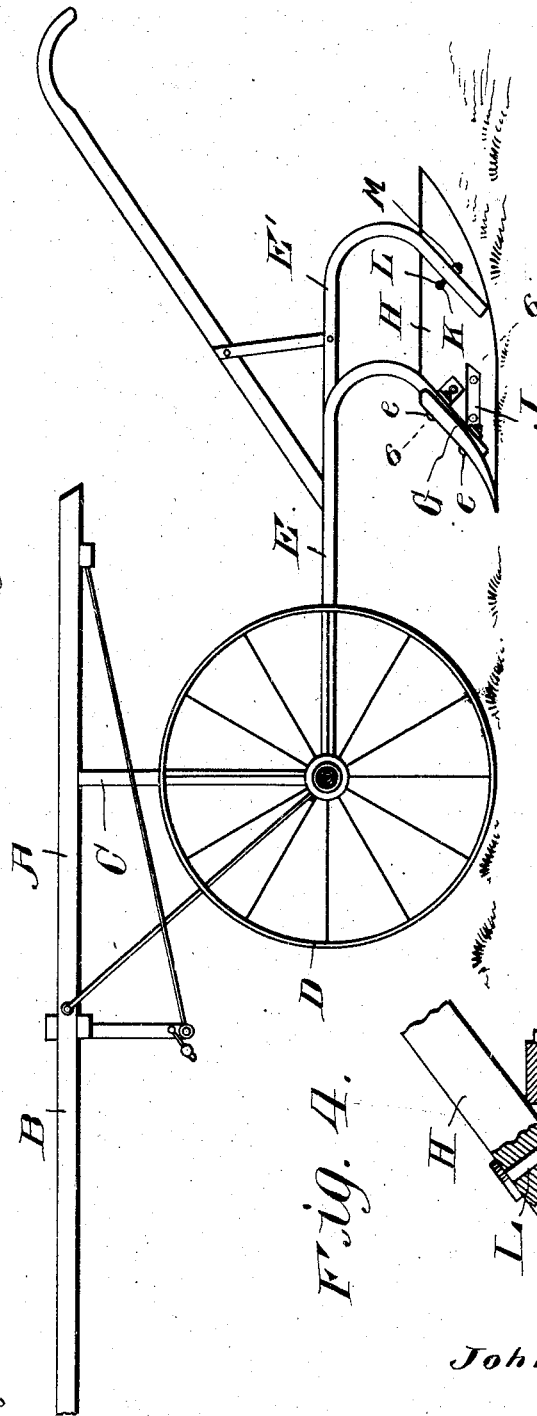
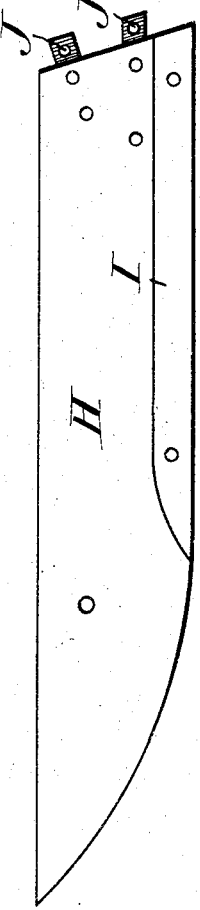
Inventor
John M. Etiman.
Witnesses
By Victor J. Evans
Attorney No. 790,623.

Patented May 23, 1905.

UNITED STATES PATENT OFFICE.

JOHN M. ETIMAN, OF MAPLETON, NORTH DAKOTA.

CULTIVATOR ATTACHMENT.

SPECIFICATION forming part of Letters Patent No. 790,623, dated May 23, 1905.

Application filed May 28, 1904. Serial No. 210,249.

*To all whom it may concern:*

Be it known that I, JOHN M. ETIMAN, a citizen of the United States, residing at Mapleton, in the county of Cass and State of North Dakota, have invented new and useful Improvements in Cultivator Attachments, of which the following is a specification.

This invention relates to a straddle-row sulky-cultivator for hilling up plants in an improved manner, which I do by securing to the shovel-beams of a cultivator suitable devices for stirring the earth between rows of plants and then piling it up into regularly-formed hills, each hill extending, if desired, the length of the row.

Referring to the drawings, Figure 1 is a plan view of my invention. Fig. 2 is a side elevation thereof. Fig. 3 is a detached view, enlarged, of my hilling attachment. Fig. 4 is a detail view illustrating the fastening at the inner end of the attachment. Fig. 5 is a sectional view showing the outer fastening for the attachment. Fig. 6 is a view in section on the line 6 6 of Fig. 2.

A indicates a straddle-row cultivator consisting in part of a tongue B, an arched axle C, carried by wheels D, and shovel-beams E E E' E', bolted to heads F, attached to the axle C to permit lateral and vertical movement of said beams, all as well known in the art. Cultivators of this class, be it remembered, have two beams E E' on each side of the arch of the axle, each pair of beams being horizontally pivoted to a head F. As generally arranged the inner beams are shorter than the outer ones and placed nearer the row to be cultivated. In my construction the outer beams E are the shorter and support on their lower ends the usual shovels G. A blade H, attached to the lower end of each short outer beam E, extends inwardly and rearwardly past the longer inner beam E', to which it is fastened by bolts.

Each blade H has its bottom edge straight from its outer end for about two-thirds its length. It is then curved or inclined in an upward direction to its inner end. It may be made of wood or metal. When wood is used, the bottom edge is armed with a metal plate I, bolted thereon and projecting below the wood to prevent undue wear to the blade. Angle-brackets J are bolted to the outer ends of the blades and to the beams E. The bolts e, which fasten the shovels G, also pass through and secure the angle-brackets in place. Each blade H is attached to its corresponding beam E' by means of an eyebolt K, fastened to the beam, and a straight bolt L, passing through the scraper and the eyebolt and secured by a nut M.

The relative position of the scrapers to each other and to the row of plants to be cultivated is clearly represented in Fig. 1, where it will be seen that the "blades" or "hillers," as I call them, are each directed inwardly and rearwardly, their rear ends being separated a short distance. As the cultivator is drawn forward the earth will be loosened by the shovels G and gathered by the blades H, which will carry the earth toward the center line, where the plants are. The inclined or curved ends of the blades H hills up earth around the plants to the best advantage for promoting their growth and preventing the earth from being washed away.

Having thus fully described my invention, what I desire to claim by Letters Patent is—

1. A straddle-row cultivator having a pair of beams on each side, the beams of each pair having downturned rear ends, being mounted at their forward ends for synchronous vertical and lateral movement, the outer beam of each pair being shorter than the inner beam, a shovel on the downturned rear end of the shorter beam, and a blade attached rigidly to the downturned rear ends of each pair of beams and inwardly and rearwardly inclined, substantially as described.

2. A cultivator having a pair of beams on each side, the outer beam of each pair being shorter, combined with a shovel on said shorter beam, a blade attached rigidly to the lower ends of each pair of beams and inclining rearwardly and inwardly, and a wearing-plate on said blade.

In testimony whereof I affix my signature in presence of two witnesses.

JOHN M. ETIMAN.

Witnesses:
 F. B. ROBINSON,
 WM. FOOTER.